Dec. 4, 1951   C. R. CARR   2,577,448
CUTOFF SAW FOR TRACTORS
Filed Feb. 20, 1948   2 SHEETS—SHEET 1

INVENTOR.
C. ROY CARR
BY
ATTORNEY

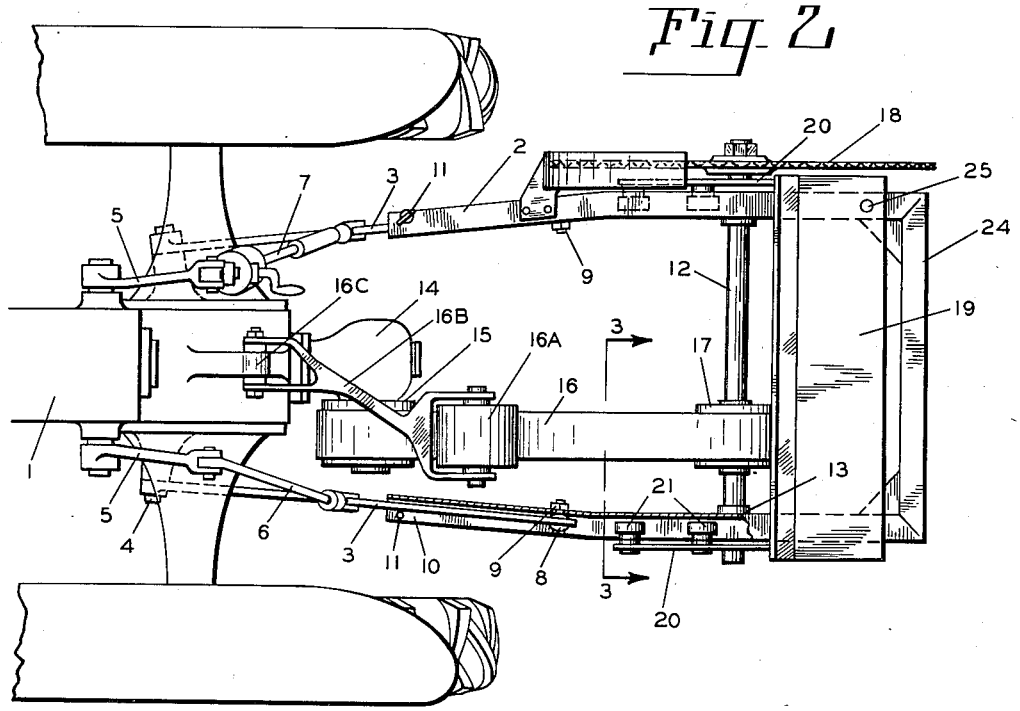

Patented Dec. 4, 1951

2,577,448

UNITED STATES PATENT OFFICE 2,577,448

CUTOFF SAW FOR TRACTORS

Clarence Roy Carr, Salem, Oreg.

Application February 20, 1948, Serial No. 9,704

1 Claim. (Cl. 143—43)

This invention relates to cut off saws and is particularly adapted to be mounted to Ford Ferguson tractor combinations.

The primary object of the invention is to provide a saw assembly that can be adapted to various types of power lifts and power take offs associated with tractors.

Another object of the invention is to drive the saw from the power take off of the tractor.

A still further object of the invention is to incorporate a movable table with the saw assembly in order to cut cord wood and the like.

By using the Ferguson lift assembly the saw can be raised and lowered while in operation, and it is particularly adapted in the bucking of logs by backing the tractor up to the log and lowering the saw into the work, or the same may be locked in one position and used for cutting cord wood and the like.

These and other incidental objects will be apparent in the drawings, specification and claim.

Referring to the drawings:

Figure 2 is a fragmentary plan view of Figure 1.

Figure 3 is a fragmentary detail sectional view taken on line 3—3 of Figure 2 looking in the direction indicated.

Figure 4 is a diagrammatical illustration of a method employed for mounting the saw assembly on the forward end of the tractor having the power take off located on the side of the tractor.

Figure 1:
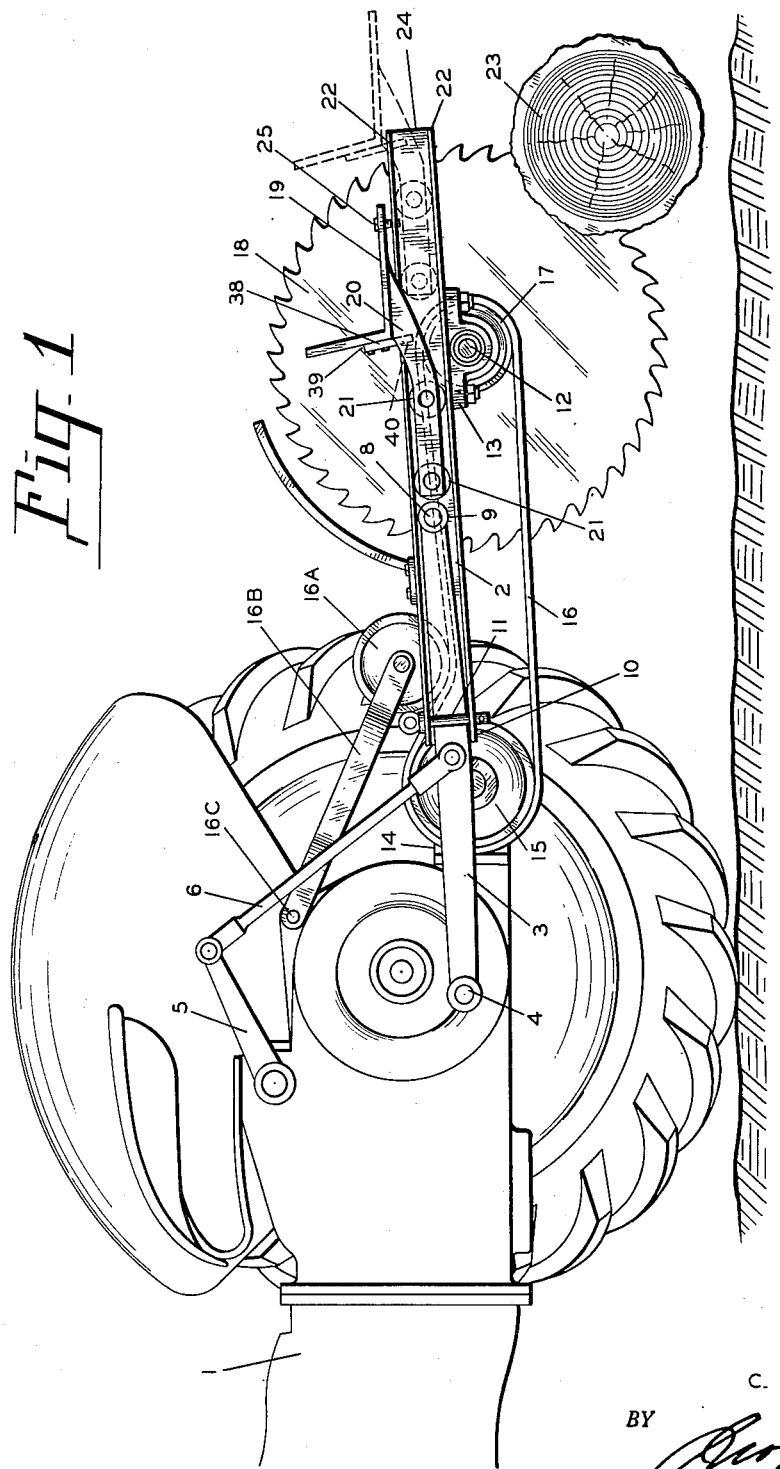
Figure 1 is a fragmentary side view of a Ford Ferguson combination wherein the driving wheel on the near side is removed illustrating the method of attaching my new and improved cut off saw assembly.

Referring more specifically to the drawings:

The rear portion of the tractor is indicated at 1. My invention consists of mounting the U-shaped channel frame 2 to the draw bars 3 which are pivotally mounted to the tractor at 4 and raised and lowered by the power lift arms 5 and the connecting links 6 and 7. The draw bars 3, the lifting arms 5 and the connecting links 6 and 7 are standard Ferguson power lift attachments to Ford tractors, but are admirably adapted for supporting and manipulating my new and improved power saw assembly.

The U-shaped channel frame 2 is bolted to the ends 8 of the draw bars 3 by the bolts 9. The ends 10 of the frame 2 are held in alignment with the draw bars by the pins 11. By this method of attachment no drilling of holes is necessary in order to mount my saw assembly to the Ferguson system.

A saw arbor 12 is journalled within bearings 13 which are secured to the U-frame 2 of the saw assembly and is driven from the power take off 14 through the drive pulley 15, belt 16 and driven pulley 17, which is keyed to the arbor shaft 12. The belt 16 is maintained in an adjusted operating tension by the floating idler 16A, which is journalled to the arm 16B, which in turn is pivotally mounted to the tractor fitting 16C. This floating idler forms part of my saw assembly.

A circular saw 18 is mounted to the shaft 12 and is driven by the said shaft. A movable platform or table 19 is mounted to the frame 2 by the supporting brackets 20 which have trunnion wheels 21 journalled thereto and operating between the legs 22 of the channel frame 2. This table or platform is provided for supporting cord wood and the like while sawing the same by the saw 18.

I will now describe the operation of my new and improved cut off saw. The tractor is backed up, for instance to the log 23, the lifting arms 5 are controlled by the power lift control lever not here shown, which will either raise or lower the draw bars 3 by the connecting links 6. This in turn raises the saw to the proper elevation for cutting the log when the tractor is backed up towards the same.

In order to make a new cut the tractor is moved ahead and backed up to the desired position on the log and the elevation of the saw is adjusted if not already at the right elevation, for cutting through the log. The outer end 24 of the frame 2 may be used as a bumper for pushing the log into the proper position as desired. All of this is done without the operator getting down from the tractor and all movements of the saw are controlled by the tractor lifts and power take off unit 14.

In the event it is desired to cut cord wood or the like the platform or table 19 is pulled towards the end 24 of the frame 2 and the wood placed on the same, at which time it is pushed forward towards the saw making the cut, as in any other type of cord wood sawing machine. When the table is not in use for sawing cord wood, a locking bolt 25 passes through the table and is threaded into the frame 2 preventing movement of the table while the saw is being used for other purposes. The said table is prevented from coming off the frame 2 when being used by the stop member 38. This stop is bolted to the table at 39, its lower end 40 striking the end 24 of the frame 2, as indicated by the dotted position in Figure 1. The table may be removed from the said frame 2 while not in use by removing the stop 38.

Referring to Figure 4, I illustrate how the same may be adapted to the forward end of a tractor wherein a pair of bell cranks 26 are keyed to a cross shaft 27 which is pivotally mounted within brackets located on the forward end of the tractor 28. A connecting link 29 connects the arm 30 of the bell crank 26 to the power operating arm 31 or other suitable lifting device associated with the tractor, the frame 2 is mounted to the arms 32 of the bell cranks 26 similar to the method illustrated on the Ford Ferguson hook up.

Idler pulleys 33 and 34 are provided for running the belt 35 over between the power take off pulley 36 of the tractor and the driven pulley 17 of the power saw assembly. These pulleys are located adjacent the shaft 27 which maintains the belt in alignment while in operation. A floating tightener 37 maintains the belt 35 in a taut condition. Where the power take off of the tractor is of sufficient height, the idler pulleys 33 and 34 may be eliminated.

What I claim as new is:

In a power saw attachment for a tractor having a lift means and a power take-off, a frame including channel shaped outwardly facing side bars having upper and lower longitudinally disposed edge flanges and a cross bar connecting the outer ends of the bars, means for releasably attaching the inner ends of the bars to the tractor, links connecting the bars with the lift means, a transverse shaft rotatably journalled on the bars and spaced from the cross bar, a saw mounted on one extremity of the shaft, drive transmission means operatively connecting the power take-off to the shaft, a table transversely disposed on the bars, brackets supporting the table and having rollers journalled thereon and rotatably disposed in the side bars whereby the table is mounted for longitudinal sliding movement on the bars, a stop member depending from the table and engageable with the cross bar to limit the outward movement of the table and locking means carried by the table and receivable in an opening formed in one of the bars for securing the table in a fixed position on the bars, said means for attaching the inner ends of the bars to the tractor including a pair of arms pivotally mounted to the tractor, fasteners securing the arms to the webs of said bars with the end of each arm lying flat against each web within the channel intermediate of the upper and lower longitudinally disposed edge flanges so that each arm is parallel to and serves as an extension of each side bar and pins removably carried by the upper and lower longitudinally disposed edge flanges of the bars in vertical relation thereto outwardly of the arms and in contact therewith for holding the arms in contact with the webs in axial alignment with the bars.

CLARENCE ROY CARR.

REFERENCES CITED

The following references are of record in the file of this patent:

UNITED STATES PATENTS

| Number | Name | Date |
| --- | --- | --- |
| 714,837 | Townsend | Dec. 2, 1902 |
| 1,126,312 | Strauss | Jan. 26, 1915 |
| 1,499,031 | Richey | June 24, 1924 |
| 1,691,581 | Mueller et al. | Nov. 13, 1928 |
| 2,310,152 | Ronning | Feb. 2, 1943 |
| 2,312,287 | Renner | Feb. 23, 1943 |
| 2,436,504 | Duncklee | Feb. 24, 1948 |
| 2,440,422 | Westmoreland | Apr. 27, 1948 |
| 2,448,123 | Richey | Aug. 31, 1948 |